United States Patent [19]

Hara

[11] Patent Number: 5,038,566
[45] Date of Patent: Aug. 13, 1991

[54] POWER SUPPLY SYSTEM FOR TURBOCHARGER WITH ROTARY ELECTRIC MACHINE

[75] Inventor: Shinji Hara, Fujisawa, Japan

[73] Assignee: Isuzu Motors Limited, Kanagawa, Japan

[21] Appl. No.: 500,451

[22] Filed: Mar. 28, 1990

[30] Foreign Application Priority Data

May 10, 1989 [JP] Japan .................................. 1-116264

[51] Int. Cl.$^5$ .............................................. F02B 37/04
[52] U.S. Cl. ........................................ 60/608; 60/607; 320/2
[58] Field of Search .................................. 60/607, 608

[56] References Cited

U.S. PATENT DOCUMENTS 4,774,811 10/1988 Kawamura ............................ 60/608
4,894,991 1/1990 Kawamura ............................ 60/608
4,955,199 9/1990 Kawamura ............................ 60/608

FOREIGN PATENT DOCUMENTS 294985 2/1988 European Pat. Off. .
3539782 5/1987 Fed. Rep. of Germany .

OTHER PUBLICATIONS

NEC Super Capacitors, NEC Electron Incorporated, 8/1980.

Primary Examiner—Leonard E. Smith
Assistant Examiner—Peter Korytnyk
Attorney, Agent, or Firm—Staas & Halsey

[57] ABSTRACT

A power supply system for supplying electric energy to a rotary electric machine coupled to a rotatable shaft of a turbocharger for supercharging an engine includes a battery for supplying electric energy to the rotary electric machine, and a capacitor connected parallel to the battery through a switching control device. The capacitor is charged with electric energy from the battery at all times. When the engine needs to be revved up for quick acceleration, the switching control device is energized to supply electric energy stored in the capacitor, together with the electric power from the battery, to the rotary electric machine. Since the capacitor has a smaller internal resistance as compared with the battery, the capacitor can supply a large current to the rotary electric machine immediately after the accelerator pedal is deeply depressed for quick acceleration.

4 Claims, 2 Drawing Sheets

POWER SUPPLY SYSTEM FOR TURBOCHARGER WITH ROTARY ELECTRIC MACHINE

BACKGROUND OF THE INVENTION

1. Field of the Invention

The present invention relates to a power supply system for supplying electric energy to a rotary electric machine combined with a turbocharger so that the rotary electric machine operates as an electric motor.

2. Prior Art

Many motor vehicle engines are associated with turbochargers for increased output power. The turbocharger has a compressor coupled to a turbine which is driven by the energy of exhaust gases emitted from the engine. The compressor is rotated by the turbine to compress intake air, which is supplied to the engine to increase its output power.

Japanese Laid-Open Patent Publication No. 60(1985)-195329 discloses a turbocharger coupled with an internal combustion engine and incorporating a rotary electric machine which can selectively operate an electric motor or generator. When the energy of exhaust gases from the engine is large, the rotary electric machine operates as a generator to recover the exhaust energy as electric energy. When the engine operates at low speed under high load, i.e., the exhaust energy is small, or the engine is revved up for quick acceleration, electric energy is supplied from a battery to the rotary electric machine to operate it as a motor to assist the turbocharger in supercharging the engine.

With the disclosed proposal, when the driver revs up the engine for quick acceleration, since the battery has an internal resistance, the electric power supplied from the battery to the rotary electric machine does not increase instantaneously, and hence the boost pressure of the turbocharger does not rise quickly. Therefore, the actual motor vehicle acceleration responsive to the driver's action for quick acceleration is slow.

SUMMARY OF THE INVENTION

In view of the aforesaid drawbacks of the conventional turbocharger power supply system, it is an object of the present invention to provide a turbocharger power supply system which supplies a rotary electric machine in a turbocharger with large electric power instantaneously when quick acceleration is needed, so that the actual acceleration is highly responsive to the driver's action for quick acceleration.

According to the present invention, there is provided a power supply system for supplying electric energy to a rotary electric machine coupled to a rotatable shaft of a turbocharger for supercharging an engine, the power supply system comprising a battery for supplying electric energy to the rotary electric machine, a capacitor connected parallel to the battery, acceleration detecting means for detecting a quick accelerating condition of the engine, control means for producing a control signal in response to an output signal from the acceleration detecting means, which represents the quick accelerating condition of the engine, and a switching control device connected between the battery and the capacitor, for supplying the electric energy from the battery to the capacitor at all times and for supplying stored electric energy from the capacitor to the rotary electric machine in response to the control signal.

The electric energy from the battery is always supplied to the capacitor to charge the same. When the engine is to be revved up for quick acceleration, the switching control device is energized to transmit the electric energy stored in the capacitor to the rotary electric machine.

Since the capacitor has a smaller internal resistance as compared with the battery, the capacitor can supply a large current to the rotary electric machine immediately after the driver's action for quick acceleration is taken.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
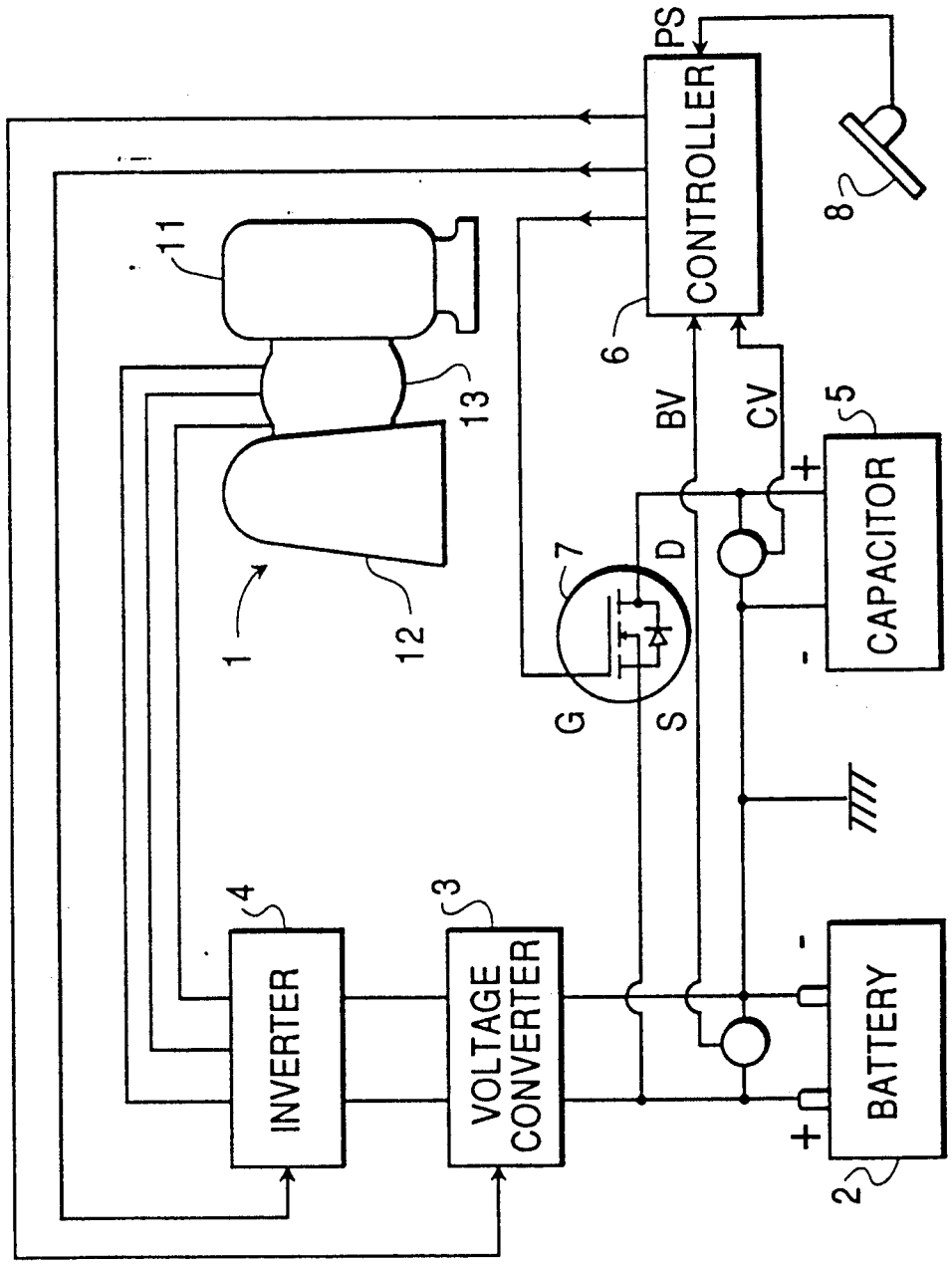
FIG. 1 is a block diagram of a turbocharger power supply system according to the present invention.

FIG. 1 shows in block form a power supply system for a turbocharger combined with a rotary electric machine.

A turbocharger 1 comprises a turbine 11 driven by the energy of exhaust gases emitted from an engine (not shown) mounted on a motor vehicle, and a compressor 12 rotated by the torque of the turbine 11 for supplying compressed air to the engine. The turbine 11 and the compressor 12 are interconnected by a rotatable shaft on which there is mounted a rotary electric machine 13 which operates selectively as an electric motor or generator.

When the energy of exhaust gases from the engine is larger than the amount of energy required to drive the compressor 12, the rotary electric machine 13 operates as a generator, which recovers the exhaust energy as electric energy to charge a battery 2 on the motor vehicle.

When the engine operates at low speed under high load, i.e., the exhaust energy is small, or the engine is revved up for quick motor vehicle acceleration, the rotary electric machine operates as a motor, which assists the compressor 12 in supercharging the engine under an increased boost pressure.

The battery 2 comprises an ordinary lead storage battery, for example, and serves as a power supply for various electric accessories on the motor vehicle and the rotary electric machine 13.

The voltage of DC electric power from the battery 2 is increased by a voltage converter 3. The voltage converter 3 has a switching circuit and a boost transformer for increasing the voltage of the supplied DC electric power up to a voltage level which is required to energize the rotary electric machine 13.

The DC electric power whose voltage has been increased by the voltage converter 3 is converted by an inverter 4 into AC electric power which has a frequency suitable to operate the rotary electric machine 13 as a motor.

A capacitor 5, which may comprise an electric double layer capacitor, has a large electrostatic capacitance that is several tens greater than the electrostatic capacitance of a conventional aluminum-electrolytic capacitor of the same volume as the capacitor 5. The capacitor 5 is connected parallel to the battery 2 through a switching control device 7 which comprises a power FET (field-effect transistor). The capacitor 5 is charged with the electric energy from the battery 2 at all times.

The power FET 7 is of the MOS type which can control a large electric current flowing therethrough. When a signal is applied to the gate of the power FET 7, a current flows from the drain D to the source S of the power FET 7 to supply the electric charges stored in the battery 5 to the voltage converter 3.

A controller 6 in the form of a microcomputer has a central processing unit for performing arithmetic operations, various memorys for storing an arithmetic sequence, a control sequence, and a control map, and an input/output port.

When the controller 6 is supplied with a signal PS from a sensor associated with an accelerator pedal 8, which signal PS represents the amount of depression of the accelerator pedal 8, a signal CV indicating the voltage across the capacitor 6, a signal indicating the rotational speed of the engine, and a signal BV indicating the voltage of the battery 2, the controller 6 effects the predetermined arithmetic sequence and produces control signals according to the control sequence and the control map.

More specifically, when the engine operates at high speed, and hence the exhaust energy is more than just large enough to enable the compressor 12 to supercharge the engine, the controller 6 controls the rotary electric machine 13 to operate as a generator. Electric power generated by the rotary electric machine 13 at this time is sent to charge the battery 2.

When the accelerator pedal 8 is quickly depressed and hence the engine needs to be revved up quickly, the controller 6 applies a signal to the gate G of the power FET 7, which then supplies the electric energy stored in the capacitor 5 through the voltage converter 3 and the inverter 4 to the rotary electric machine 13. The rotary electric machine 13 now operates as a motor to assist the turbocharger 1 in increasing its boost pressure.

Operation of the turbocharger power supply system thus constructed will be described below with reference to FIGS. 2 and 3.

Figure 2:
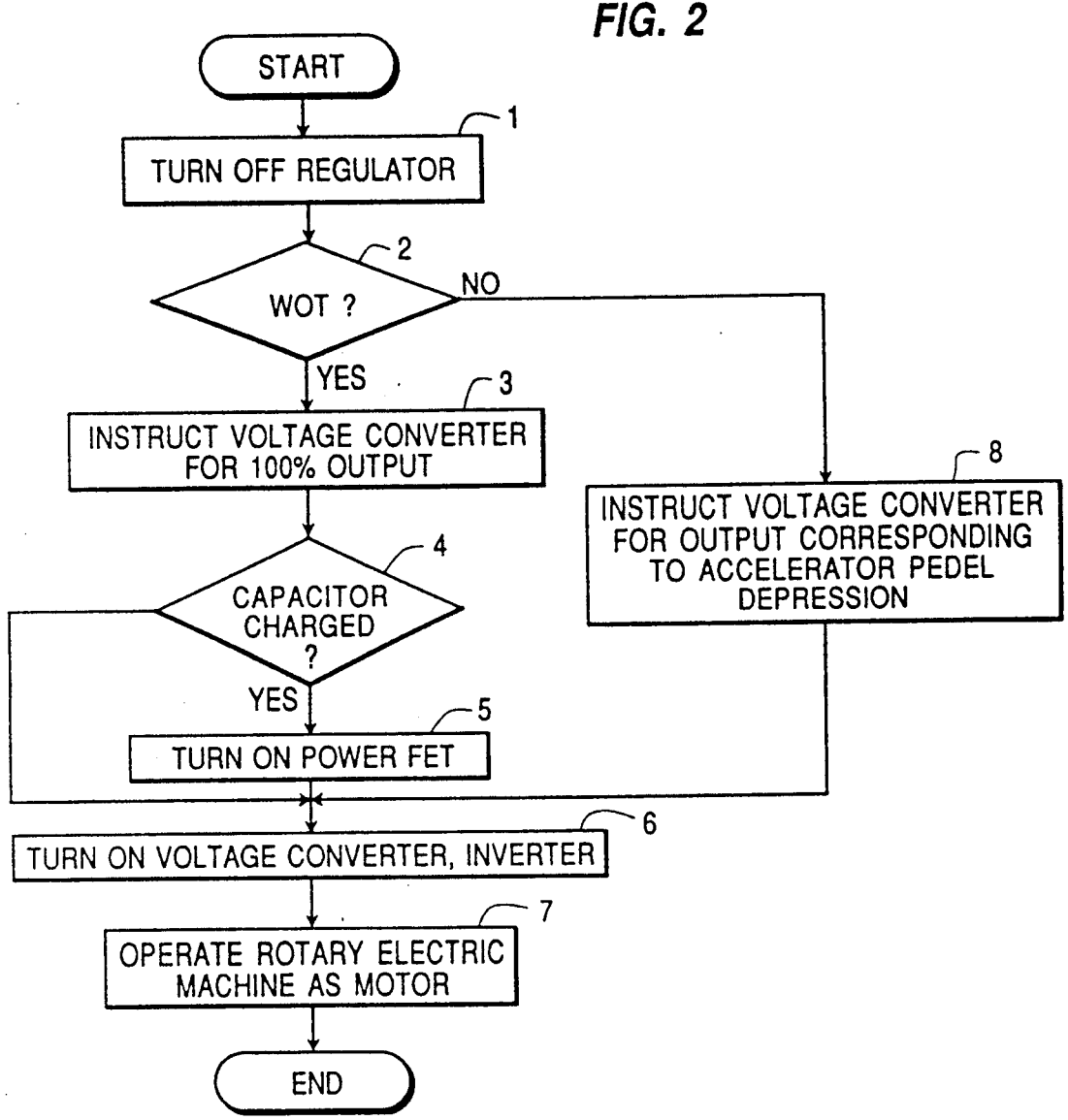
FIG. 2 is a flowchart of an operation sequence of the turbocharger power supply system.

FIG. 2 shows a processing sequence for operating the rotary electric machine 13 as a motor.

After a regulator is turned off in a step 1, the controller 6 determines, in a step 2, whether the amount of depression of the accelerator pedal 8 is maximum (in WOT: Wide Open Throttle position) or not based on the signal PS from the accelerator pedal 8.

If the amount of depression of the accelerator pedal 8 is maximum, control goes to a step 3 in which the controller 6 instructs the voltage converter 3 to produce a maximum output, i.e., a 100% output.

Then, the controller 8 checks the charged condition of the capacitor 5 based on the voltage signal CV from the capacitor 5 in a step 4. If the capacitor 5 is charged beyond a predetermined level, then the controller 8 applies a signal to the gate G of the power FET 7 to turn it on. The signal applied to the gate G of the power FET 7 is held for a predetermined period of time.

In a step 6, the controller 6 applies control signals to the voltage converter 3 and the inverter 4 to operate them. The rotary electric machine 13 is immediately supplied with AC electric power having a predetermined frequency, and starts to operate as a motor in a step 7.

If the amount of depression of the accelerator pedal 8 is not maximum (WOT position) in the step 2, then control goes to a step 8 in which the controller 8 gives the voltage converter 3 a control signal indicating a voltage increase which corresponds to the amount of depression of the accelerator pedal 8. The step 8 is followed by the step 6 in which the electric energy from only the battery 2 is supplied through the voltage converter 3 and the inverter 4 to the rotary electric machine 13, which assists the compressor 12 in supercharging the engine.

If the capacitor 5 is not sufficiently charged in the step 4, then the electric energy from only the battery 2 is also supplied to the rotary electric machine 1 in the step 6.

Figure 3:
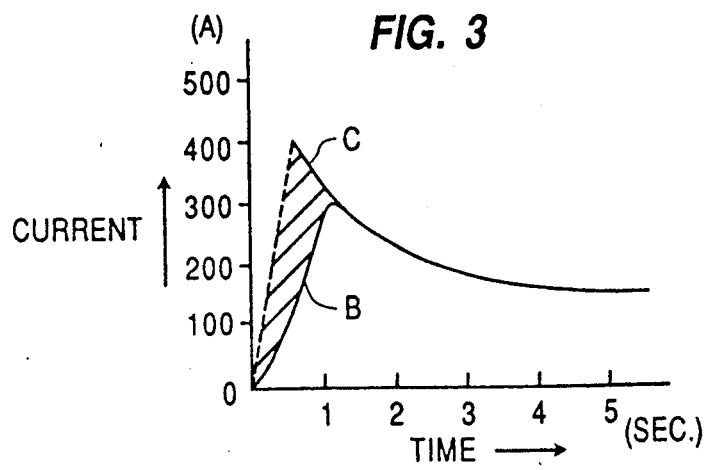
FIG. 3 is a graph showing how currents supplied from a capacitor and a battery vary with time.

The current supplied from the capacitor 5 varies with time as indicated by the curve C in FIG. 3. More specifically, since the internal resistance of the capacitor 5 is small, the capacitor 5 supplies a large current as indicated by the curve C immediately after it has started supplying the stored electric energy. Therefore, the rotary electric machine 13 is intensively driven to assist the compressor 12 in supercharging the engine. The boost pressure of the turbocharger 1 rapidly rises, and the rotational speed and the torque of the engine go up quickly. Therefore, the engine is revved up with a sharp response.

Though the capacitor 5 supplies the large current immediately after it has started supplying the stored electric energy, as indicated by the curve C in FIG. 3, the supplied current decreases in a short period of time, and taken over by a current from the battery 2, which rises less sharply as indicated by the curve B in FIG. 3.

The period of time during which the control signal applied to the gate G of the power FET 7 by the controller 6 in the step 5 is held is an interval of time after the capacitor 5 has started supplying the stored electric energy until the curve C is taken over by the curve B.

Although a certain preferred embodiment has been shown and described, it should be understood that many changes and modifications may be made therein without departing from the scope of the appended claims.

What is claimed is:

1. A power supply system for supplying electric energy to a rotary electric machine coupled to a rotatable shaft of a turbocharger for supercharging an engine, said power supply system comprising:
    a battery for supplying electric energy to the rotary electric machine;
    a capacitor connected parallel to said battery;
    acceleration detecting means for detecting a quick accelerating condition of the engine;
    control means for producing a control signal in response to an output signal from said acceleration detecting means, which represents the quick accelerating condition of the engine; and
    a switching control device connected between said battery and said capacitor, for supplying the electric energy from said battery to said capacitor at all times and for supplying stored electric energy from said capacitor to the rotary electric machine in response to said control signal.

2. A power supply system according to claim 1, wherein said capacitor comprises an electric double layer capacitor.

3. A power supply system according to claim 1, wherein said switching control device comprises a power MOSFET.

4. A power supply system according to claim 1, wherein said acceleration detecting mean comprises a sensor for detecting the amount of depression of an accelerator pedal of the engine, and applying the output signal to said control means when the amount of depression of the accelerator pedal is maximum.

* * * * *